A. FOLSOM.
WATER AND WIND WHEELS.

No. 195,114. Patented Sept. 11, 1877.

WITNESSES
William H. Bliss
Orrin L. Baunt

INVENTOR
Andrew Folsom

UNITED STATES PATENT OFFICE.

ANDREW FOLSOM, OF BARRINGTON, RHODE ISLAND.

IMPROVEMENT IN WATER AND WIND WHEELS.

Specification forming part of Letters Patent No. 195,114, dated September 11, 1877; application filed March 21, 1876.

*To all whom it may concern:*

Be it known that I, ANDREW FOLSOM, of Barrington, in the county of Bristol and State of Rhode Island, have invented certain new and useful Improvements in Water and Wind Wheels, and the combination of the same, so that nearly all the water passing through a certain sluiceway can be utilized; and I do hereby declare that the following is a full, clear, and exact description of the same, reference being had to the accompanying drawing, forming a part of this specification.

Figure 1:
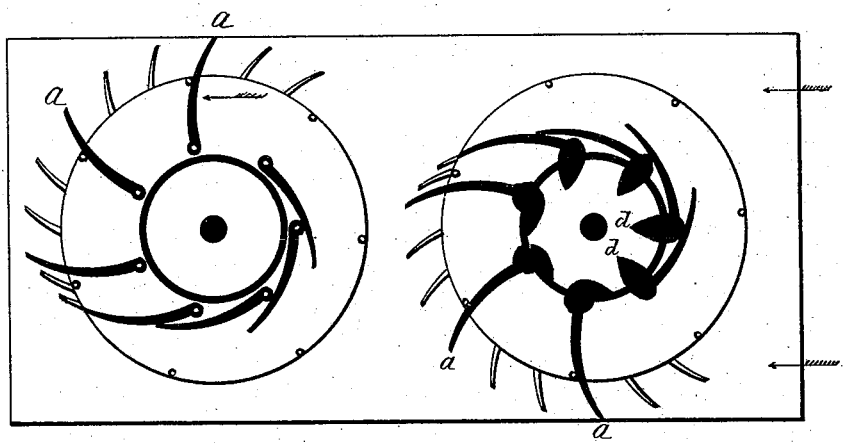
Figure 2:
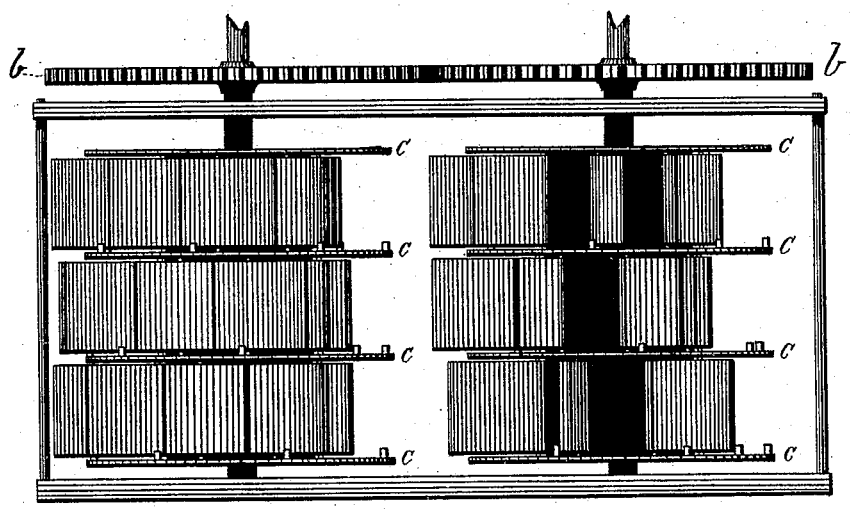

Figure 1 is a horizontal section of wheels, showing the combination and the extension-stops. Fig. 2 is a side view of wheels with combination gears.

My invention relates to the combining of two or more wheels, such as are substantially specified in Letters Patent No. 113,284, granted to me and dated April 4, 1871, and the stops against which the buckets rest.

The wheels are placed one in the rear of the other in a sluiceway, so that the water passing through the sluiceway by means of the buckets $a\ a$ causes the first wheel to operate in one direction, and, passing on to the next wheel, causes it to operate in the opposite direction. This is done by arranging the buckets $a\ a$ and others so that they will open on different sides of different wheels, as shown in Fig. 1.

The water passing through the sluiceway is thus nearly all utilized, by means of which double the power is obtained by using two wheels that is obtained by using one wheel. A number of wheels may thus be arranged in a sluiceway turning in alternate directions, and a large amount of power thus obtained. The wheels may be connected by spur-gears $b\ b$ or otherwise, and power may be taken from the shaft of either wheel, or from the shafts of all the wheels at the same time.

Great power may also be obtained by sinking the wheels deep in the water, as the force of the current on the buckets increases in the same proportion, according to depth, as in high heads of water.

The wheels when arranged for wind-power may be placed one above the other, so that the bottom of the upper wheel will connect with the top of the lower wheel by spur-gear or otherwise, so that the wind will strike the buckets of both wheels with full force, which, when blowing from certain directions, it would not do if the wheels were placed side by side on the same plane.

The wheel may be constructed without the plates $c\ c\ c\ c$. The buckets are then stopped when opened sufficiently, by means of projections attached to the pivoted ends of the buckets $a\ a$ inside the drum, which buckets are so attached to the drum as to project through said drum, and are pivoted to said drum, where they pass through. These projections are attached to the buckets at any desired angle, so that the buckets may be stopped when opened at any desired angle. When the buckets are opened these projections or extension-stops bring up against the inside of the drum $c$, as shown in Fig. 1. The sides of these stops conform to the curve of the inside of the drum. In case the wheel is so constructed, a number of wheels may be placed very near together, as the buckets opening on different sides of different wheels will not interfere with each other.

What I claim is—

The combination of two or more wheels in the same sluiceway, in the manner herein substantially set forth, and the extension-stops $d\ d$, as and for the purpose specified.

ANDREW FOLSOM.

Witnesses:
IRVING CHAMPLIN,
HERMANN KOERNER.